July 15, 1969  V. L. STERN  3,455,093

ADJUSTING HOLDDOWN CLIP

Filed Feb. 27, 1967

INVENTOR
VERNON L. STERN

BY *[signature]*

ATTORNEYS

United States Patent Office 3,455,093
Patented July 15, 1969

3,455,093
ADJUSTING HOLDDOWN CLIP
Vernon Lloyd Stern, Seymour, Mo.
(Rte. 12, Box 142, Springfield, Mo. 65804)
Filed Feb. 27, 1967, Ser. No. 619,893
Int. Cl. A01d 55/08, 35/12
U.S. Cl. 56—305
4 Claims

ABSTRACT OF THE DISCLOSURE

An adjustable resiliently mounted clip having anti-friction means for maintaining a sickle blade in close cutting relation with a ledger plate on a tractor mounted sickle bar mower.

BACKGROUND OF THE INVENTION

Field of the invention

The invention pertains to harvesters of various kinds and particularly to reciprocating cutter members having guides for directing vegetation to the cutter members.

Description of the prior art

The prior art discloses many methods of mounting blades on sickle bar mowers and some of these have been provided with spring means for maintaining the sickle blade in cutting relation with a ledger blade under a resilient tension. Due to the lateral cutting movement of the sickle blade, such blade and the clip which holds it down under tension are subjected to excessive wear through friction which has shortened the useful life of both the blade and the clip. The replacement of the blade and the clip has been a difficult and tedious job since it has been necessary to disassemble a substantial portion of the mower and thereafter reassemble the mower using new parts. For these and other reasons, the prior art devices have not been entirely satisfactory.

SUMMARY

The present invention is an adjustable hold down clip for a sickle bar type mower which has a spring or other resilient means for maintaining the sickle blade and the ledger blade in cutting relation under a predetermined pressure. The hold down clip is provided with an anti-friction device to reduce wear between the sickle blade and the clip so that both will have a longer useful life. Also, means is provided for quickly releasing the pressure between the sickle blade and the clip when it becomes necessary to replace the anti-friction device.

DESCRIPTION OF THE PREFERRED EMBODIMENT

Figure 1:
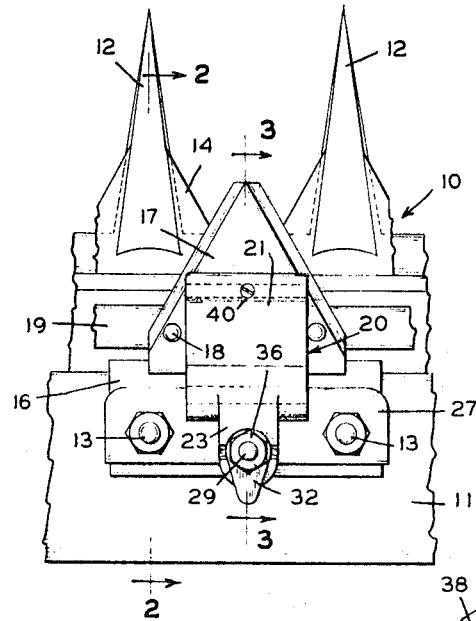
FIG. 1 is a fragmentary top plan view of a sickle bar mower illustrating one application of the invention.
Figure 4:
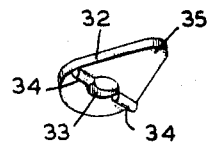
FIG. 4, an enlarged bottom perspective of the pressure release plate.
Figure 5:
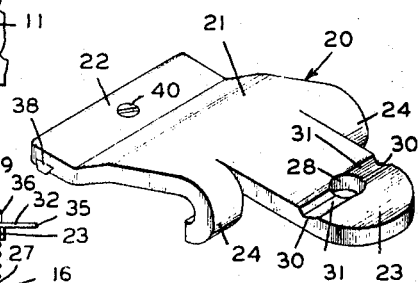
FIG. 5, an enlarged top perspective of the clip per se.
Figure 2:
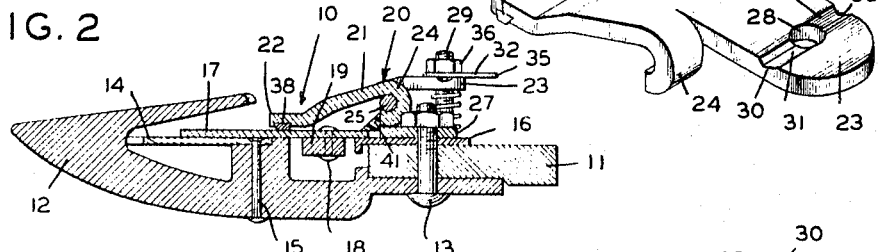
FIG. 2, a section on the line 2—2 of FIG. 1.
Figure 3:
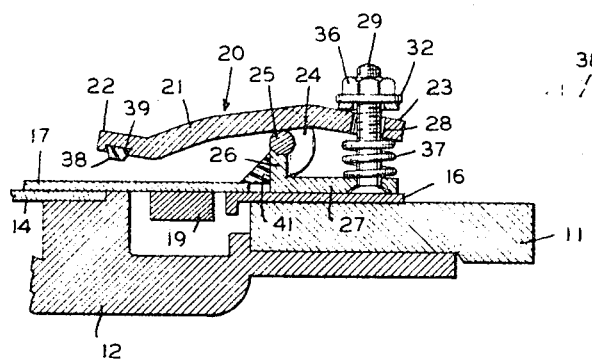
FIG. 3, an enlarged fragmentary section on the line 3—3 of FIG. 1 showing the clip in raised position.

With continued reference to the drawing, a sickle bar 10 is provided which may be mounted on a tractor or other propelling vehicle (not shown) in any desired manner. The sickle bar has a mower bar 11 with a plurality of heavy duty guards 12 mounted thereon by guard bolts 13 in spaced relation along the mower bar 11. A ledger plate 14 is attached in fixed position to each of the guards by rivets 15 or other fastening means. A wear plate 16 is adjustably mounted on the mower bar 11 and a sickle blade or sickle section 17 is slidably carried by the wear plate 16 and the ledger plate 14. A plurality of sickle blades 17 are mounted by rivets 18 or other fasteners on a cutter bar 19 which is adapted to be moved back and forth laterally by mechanical means on the tractor to cause the sickle blade to move laterally across the ledger plate to cut grass or other vegetation. The structure thus described is of conventional construction and forms no part of the inventive concept.

In order to maintain the sickle blade and the ledger plate in cutting relation, a hold down clip 20 is provided having a body 21 with a foot 22 at one end and a tongue 23 at the opposite end. A pair of curved hinge forming portions 24 are carried by body 21 intermediate the foot and the tongue and such hinge portions are swingably mounted on a generally horizontally disposed hinge pin 25 carried by an upstanding arm 26 of a generally horizontal base plate 27 mounted on the mower bar 11. The tongue 23 is provided with an opening 28 for the reception of a bolt 29 carried by the base plate 27 and extending upwardly therefrom. The upper surface of the tongue 23 has a pair of opposed grooves 30 extending radially outwardly from the opening 28 and such grooves have beveled or tapered portions 31 on at least one side of each groove. As illustrated the grooves are beveled in a counterclockwise direction, although for the purposes of the invention they could be beveled in a clockwise direction or in both clockwise and counter-clockwise directions.

A pressure release member 32 is rotatably mounted on the bolt 29 above the tongue 23 and such pressure release member is provided with an opening 33 and a pair of opposed depending projections 34 on opposite sides of the opening 33. The projections 34 normally are received within the grooves 30 and are movable outwardly thereof along the beveled portions 31 of the grooves when an operating portion 35 of the pressure release member is moved to rotate such member about the bolt 29. The pressure release member 32 is adjustably mounted on the bolt 29 by a self-locking nut 36. A spring or other resilient member 37 is disposed about the bolt 29 between the tongue 23 and the base plate 27 and is adapted to exert an upward pressure against the tongue to cause the body 21 to swing about the hinge pin 25 so that the foot 22 will exert a downward pressure against the sickle blade 17.

Since the sickle blade 17 will be moved laterally while the clip 20 remains in substantially the same position, the foot 22 is provided with an anti-friction rub strip 38 which bears against the sickle blade 17. The rub strip can be constructed of any suitable anti-friction material, a material having the trade name "Marlex" having been found satisfactory. The rub strip 38 is replaceably mounted on the lower portion of the foot 22 by means of a dovetail groove 39 in which the rub strip having a cooperating configuration is slidably mounted and held in position by a set screw 40. If desired the rear portion of the sickle blade 17 may be held against the wear plate 16 by a second adjustable rub strip 41 mounted on the upstanding arm 26 of the base plate 27 in any desired manner, as by mounting screws (not shown).

Figure 6:
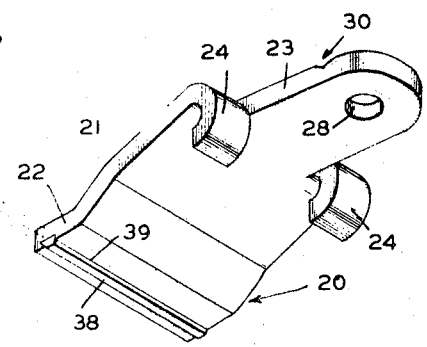
FIG. 6, an enlarged bottom perspective of the clip.

In the operation of the device, the spring 37 applies an upward force on the tongue 23 and causes the clip to swing about the hinge pin 25 until the anti-friction rub strip 38 engages the upper surface of the sickle blade 17 and applies a downward pressure thereto. Such downward pressure can be adjusted by moving the nut 36 along the bolt 29. As the rub strip is worn down the nut 36 can be moved outwardly along the bolt 29 to readjust the pressure on the sickle blade to the desired amount. When the rub strip 38 eventually is worn down to the point where it loses its efficiency, the pressure release member 32 is rotated substantially 90° to cause the depending projections 34 to move up the inclined portions 31 of the grooves 30 and force the body 21 downwardly against the tension of the spring. The downward movement of the rear portion of the body swings the body about the hinge pin 25 and raises the foot 22. After the foot has been raised the set screw 40 is removed from engagement with the rub strip 38 whereupon such rub strip can be removed laterally from the clip, as illustrated in phantom in FIG. 6. Thereafter a new rub strip can be slid into the dovetail groove 39, the set screw moved downwardly into engagement, and the pressure release member 32 moved back to its original position with the depending projections 34 located within the grooves 30. Thereafter the nut 36 can be adjusted so that the desired pressure is exerted by the clip 20 on the sickle blade 17.

It will be apparent that a relatively simple readily adjustable hold down clip has been provided having a replaceable rub strip on one end and spring means on the opposite end which will apply a predetermined pressure on a sickle blade to maintain the sickle blade in cutting relation with the ledger plate of a sickle bar mower.

It will be obvious to one skilled in the art that various changes may be made in the invention without departing from the spirit and scope thereof.

What is claimed is:

1. An adjustable hold down clip for use on a sickle bar mower having a ledger plate and a sickle blade having front and rear portions, said hold down clip comprising a base palte mounted on said mower and having hinge means thereon, a body swingably mounted on said hinge means, said body having top and bottom portions and a foot at one side of said hinge means and a tongue at the opposite side thereof, bolt means mounted on said base plate and extending upwardly through said tongue, resilient means disposed between said base plate and said tongue, a pressure release member rotatably mounted on said bolt means above said tongue and having portions engageable therewith, means on said pressure release member for depressing said tongue against the tension of said resilient means when said pressure release member is rotated, and an anti-friction rub strip removably mounted on the bottom portion of said foot, whereby said resilient means will swing said body about said hinge means until said rub strip applies a predetermined pressure to said sickle blade.

2. The structure of claim 1 in which said body includes a dovetail groove entirely across the bottom portion of said foot portion and of a predetermined depth, and said rub strip is of a cross-sectional configuration corresponding to the dovetail groove of said body and of a thickness greater than the depth of said groove.

3. The structure of claim 1 including an additional rub strip mounted on said base plate adapted to overlie the rear portion of said sickle blade.

4. An adjustable hold down clip for use on a sickle bar mower having a ledger plate and a sickle blade, said hold down clip comprising a base plate having hinge means thereon, means for mounting said base plate on said mower, a body having top and bottom portions swingably mounted intermediate its ends on said hinge means, bolt means carried by said base plate and extending upwardly through one end of said body, resilient means located between said base plate and said one end of the body and exerting an upward force on said one end to swing said body about said hinge means, a pressure release member rotatably mounted on said bolt means above said one end of the body and engageable therewith, adjustable means for maintaining said pressure release member in fixed vertical position while permitting rotation thereof, means on said pressure release member for depressing said one end of said body against the tension of said resilient means when said pressure release member is rotated, the other end of said body having a groove in the bottom portion thereof, an anti-friction rub strip having a portion complementary to and receivable within said groove, and means for retaining said rub strip in position, whereby said resilient means will swing said body about said hinge means until said rub strip is in engagement with said sickle blade and said sickle blade is substantially freely laterally movable.

References Cited

UNITED STATES PATENTS

| | | | |
|---|---|---|---|
| 1,165,169 | 12/1915 | Hawkins | 56—305 X |
| 1,428,657 | 9/1922 | Purdy | 56—305 |
| 1,754,302 | 4/1930 | Barlow | 56—305 |
| 3,052,078 | 9/1962 | Padgett | 56—305 |

ANTONIO F. GUIDA, Primary Examiner

P. A. RAZZANO, Assistant Examiner